United States Patent
Zohar et al.

(10) Patent No.: US 6,462,787 B1
(45) Date of Patent: Oct. 8, 2002

(54) DIGITAL GHOST CANCELLATION USING TELETEXT DATA LINES

(75) Inventors: Ariel Zohar, Kiryat Hsim; Yonatan Manor, Haifa, both of (IL)

(73) Assignee: Oren Semicondcutor Ltd., Yogne Am Illit (IR)

( * ) Notice: Subject to any disclaimer, the term of this patent is extended or adjusted under 35 U.S.C. 154(b) by 0 days.

(21) Appl. No.: 09/450,712

(22) Filed: Nov. 30, 1999

(51) Int. Cl.[7] ............................................... H04N 5/213
(52) U.S. Cl. ....................................... 348/614; 348/607
(58) Field of Search ................................. 348/614, 607, 348/611, 468, 624; H04N 5/21, 5/213

(56) References Cited

U.S. PATENT DOCUMENTS 4,424,533 A * 1/1984 Rzeszewski ................ 348/614

* cited by examiner

Primary Examiner—Sherrie Hsia
(74) Attorney, Agent, or Firm—Browdy and Neimark

(57) ABSTRACT

A method for reducing a ghost constituent of a composite video signal. The composite video signal includes a teletext data lines constituent. The method includes the step of detecting and processing two teletext data line constituent so as to obtain a ghost induced error. The method of further includes the step of utilizing the ghost induced error for calculating filter coefficients and applying the composite video signal to a filter having the filter coefficient for obtaining deghosted composite video signal.

17 Claims, 6 Drawing Sheets

DIGITAL GHOST CANCELLATION USING TELETEXT DATA LINES

FIELD OF THE INVENTION

The present invention is in the field of video TV imaging reduction and in particular concerns ghost cancellation application.

BACKGROUND OF THE INVENTION

For a better understanding of the background of the invention, there follows a brief description of the so-called ghost phenomenon in TV video imaging. Ghosts are created by reflections of the broadcast TV signal from large objects such as mountains and buildings. The reflections of the main signal appear at the TV antenna as delayed, or preceded and attenuated duplicates of the main signal. When the TV antenna receives the reflections together with the main broadcast signal, they are displayed on the screen as "ghosts".

The interference caused by ghosts not only annoys the viewer, but also degrades the correct operation of the TV circuits. To facilitate the operation of the TV, synchronization signals are transmitted together with the video signal. Reflections that cause ghosts not only distort the image, but also distort the teletext signal.

In accordance with prior art technique, the interference of strong ghosts cannot be avoided or corrected, unless the TV device has a so called ghost canceller module and the broadcast TV signal has GCR (ghost canceling reference) incorporate therein. The Ghost Canceller extracts the GCR (Ghost Canceling Reference) out of the received video, if it is broadcast, and compares it (by means of subtraction) to the expected GCR tat is a-priori stored in the application memory. If the subtraction is approximately zero, this indicates that no ghost (or other interference) is induced, otherwise an error is produced which indicates that ghost exists. In the latter case, a correlation is applied between the error and the input (output in modified LMS algorithm, used by the Ghost Canceller), set of filter taps is built, for compensating the ghost phenomenon and bring about ghost-free image.

A GCR whilst giving rise to the ghost cancellation is not always present in the TV broadcast signal.

There is accordingly a need in the art to provide for a system and method which enables ghost reduction (referred to also as "deghosting") from TV image (referred to generally also as composite video signal), whilst avoiding the use of GCR.

SUMMARY OF THE INVENTION

In accordance with the a broad aspect of the invention the ghost constituent of a composite video signal is reduced without using a GCR, but rather processing at least one teletext data line constituent (referred to occasionally, in short, also as teletext line) of the composite video signal so as to obtain a ghost induced error. The ghost induced error is then utilized to calculate filter coefficients that are fed to a filter. The filter having the specified filter coefficients is applied to the input composite video signal (after handling errors that stem from asynchroneouous sampling, as will be explained in detail below) for equalization step giving rise to substantially deghosted composite video signal, i.e. a video signal where the ghost constituent is reduced or even eliminated.

Accordingly, in accordance with the broadest aspect of the invention there is provided a method for reducing a ghost constituent of a composite video signal; the composite video signal includes a tele-text data lines constituent; the method comprising the steps of:

(a) detecting and processing at least one teletext data line constituent so as to obtain an ghost induced error; and (b) utilizing said ghost induced error for calculating filter coefficients.

(c) applying said composite video signal to a filter having said filter coefficient for obtaining substantially deghosted composite video signal.

There is further provided a system for reducing a ghost constituent of a composite video signal; the composite video signal includes a teletext data lines constituent; the system comprising:

(a) a unit for detecting and processing at least one teletext data line constituent so as to obtain an ghost induced error; and (b) a unit utilizing said ghost induced error for calculating filter coefficients (c) applying said composite video signal to a unit having said filter coefficient for obtaining substantially deghosted composite video signal.

In accordance with a preferred embodiment, the deghosting process is improved by enhancing the high frequencies of each teletext line used for the subsequent equalization process. Having done this, the base filter on which the equalizer builds its taps in an iterative manner (as will be explained in detail below), is a lowpass filter, therefore it helps he equalizer to accomplish enhanced performance in a relatively short time.

The pre-processing of teletext data lines (before running the equalization process that brings about the deghosted signal is required in order to compensate for the off-phase sampling due to the asynchronous sampling of the teletext data line (or lines). The compensation will bring about synchronized sampling with the teletext data lines. By a specific embodiment, this is accomplished by determining the sampling phase error by filtering the teletext synchronization pattern with matched filter, and then by approximate the peak of the matched filter result to a $2^{nd}$ order (parabolic) polynom.

By a specific embodiment, the step of determining the sampling phase error utilizes the Viehta rule for the peak position. By this embodiment the specified compensation for the off-phase samples includes calculating filter coefficients $h_I$ which will enable to interpolate the in-phase samples so as to achieve interpolated synchronized sampling with the pre-defined teletext data line samples.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF SPECIFIC EMBODIMENTS

Generally speaking, the deghosting in accordance with the invention uses preferably, although not necessarily, two teletext lines (appearing at the same field or at different fields) to evaluate the error induced by the ghosts. To this end, there is provided an automatic teletext detection step to determine the presence of the teletext data lines and identiy the lines (in the field) in which they are located. A typical, yet not exclusive, procedure of detecting teletext line or lines is by using e.g. a known per se Sync Separator Unit (SSU) which identifies a video signal line and then applying a known per se match filter which matches the specified signal to a priori stored teletext synchronization pattern (see 100 in FIG. 1). When the matching degree exceeds a given threshold this indicates in a high degree of confidence that a teletext synchronization pattern has been detected. The teletext detection procedure is typically performed only once (within a reference field), and after determining the location of the teletext lines (normally residing in lines 10 to 20 of the video field), the teletext lines can be acquired from thee correct lines in subsequent fields.

As will be explained in greater detail below one or more teletext lines may be utilized in a given field. The invention is not bound to the specified manner for detecting teletext lines.

Figure 3:
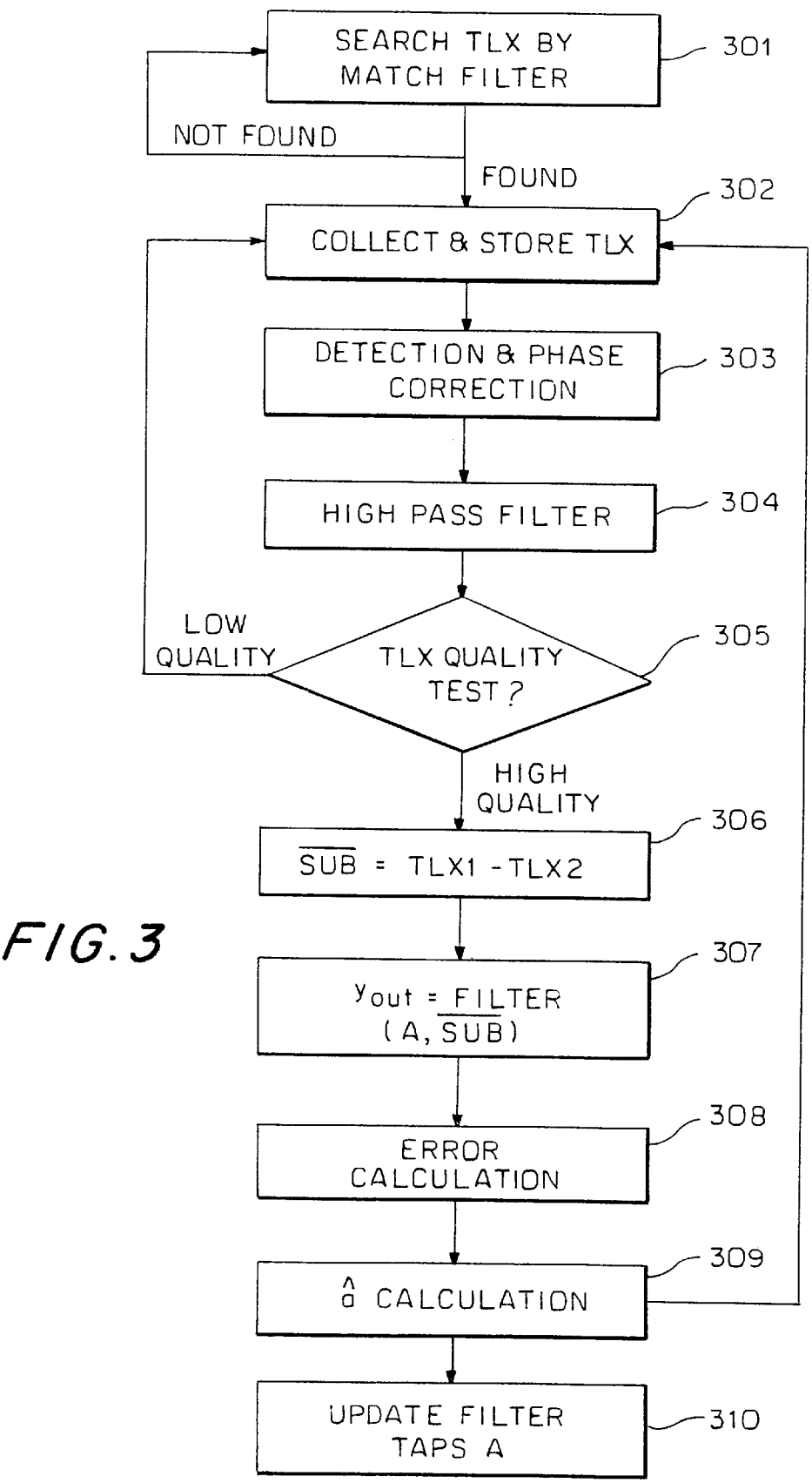
FIG. 3 is a block diagrams of a generalized deghosting module in accordance with the invention.
Figure 4:
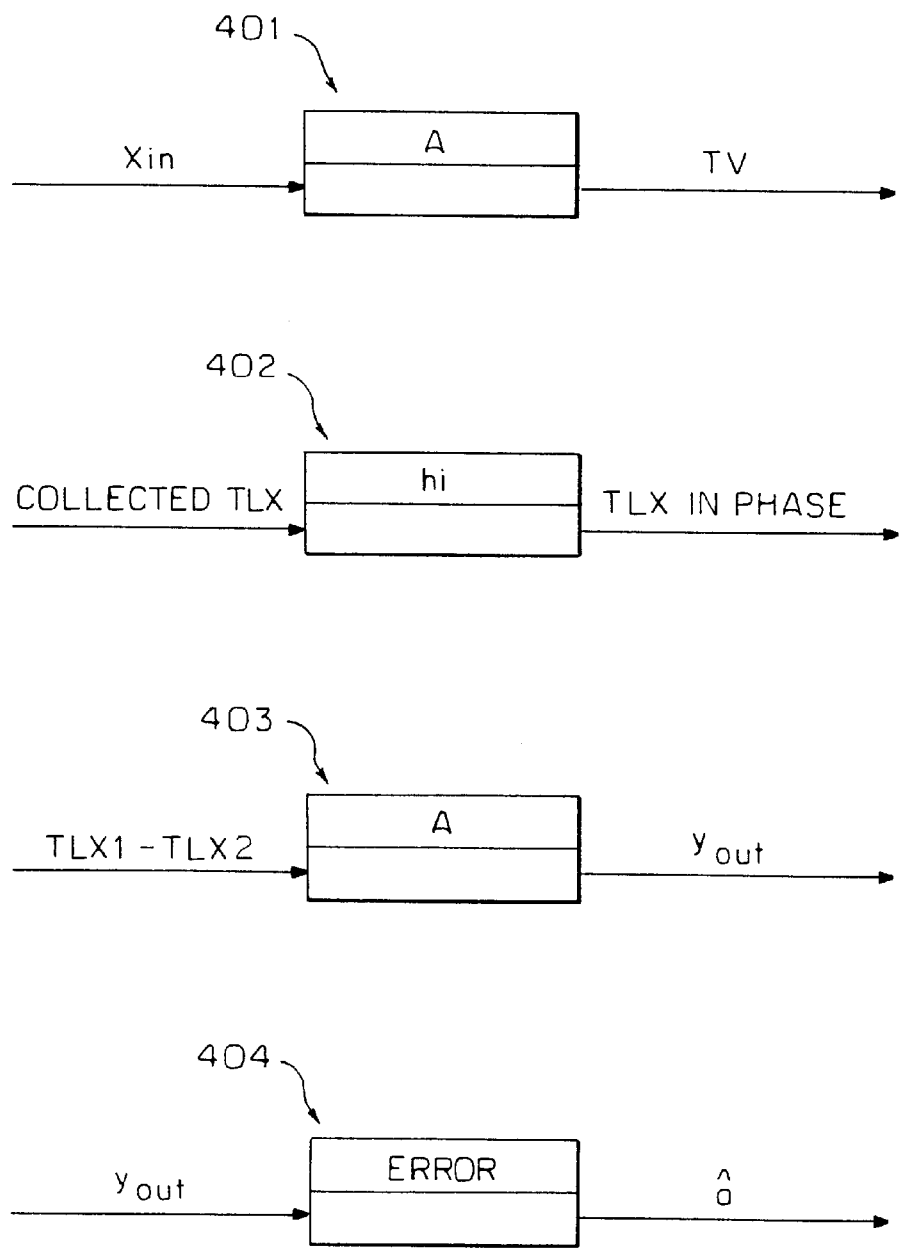
FIG. 4 is a flow diagram of a typical sequence of operation in a deghosting system in accordance with the invention.

Before turning to the description of the specific procedure, a general overview of the operational steps in accordance with the invention is given with reference to FIG. 3 and 4. Thus, at first the composite video signal is searched for detecting the location of teletext data lines (301), (normally between lines 10 to 20 in the video field). This set up procedure is performed once and thereafter the teletext lines will be collected from the same locations in subsequent fields. Having identified the location of the teletext lines, they are collected and stored for subsequent processing (302).

The so stored data is processed (as will be explained in greater detail below) during the invisible portion of the composite video signal. It is recalled in this connection that normally (although not necessarily) only lines 24 and onwards are visual and accordingly the processing is confined to the unseen portion (e.g. lines 3 to 6) of the composite video signal.

The captured teletext data lines are processed in, say, line 3 of the subsequent field. Thus, the sampling error (off phase) in the synchronization pattern of the teletext line is detected and treated (303) so as to bring about substantially in-phase estimated samples. The end result of this calculation is obtaining filter coefficients $h_f$ which are applied to the collected "off-phase"teletext data samples and bring about interpolated in-phase teletext data samples. (see. 402 in FIG. 4). The operation of a digital filter of this kind is generally known per se and accordingly the internal structure thereof is not expounded upon herein.

Having obtained corrected interpolated in phase teletext data lines samples, a High Pass Filtering enhancement step is applied (as will be explained in greater detail below not shown) for enhancing the high frequency part of the collected teletext data line (304).

The sampling error correction step described above is essential for accomplishing the subsequent deghosting reduction. Before proceeding to the deghosting step, there is applied a teletext data quality test (305) for discarding teletext data lines which do not meet a certain quality criterion.

There follows now a general description of the subsequent deghosting phase. At first, one teletext line is subtracted from the other (306) (taken from the same field or, e.g. from the sane location in a previous field) for removing DC component and, it is now possible to determine whether there exists a ghost constituent, by testing whether the subtracted values coincide with one of the three pre-defined levels that would have been obtained had the signal been ghost free. In the case that the subtracted values coincide with the pre-defined levels, this indicates that the signal is substantially ghost free, otherwise the discrepancy (between the subtracted values and the pre-defined level) indicates ghost induced error which should be reduced or eliminated.

The subtracted values along with filter taps A (which are initially zeroed) are fed to a filter, for generating $Y_{OUT}$ value (307). This procedure is practically performed in say, line 4 (403) of the composite video signal. Having obtained $Y_{OUT}$, the specified ghost induced error is calculated (308) and thereafter a set of modified coefficient â is calculated (309) and (404) in FIG. 4. The calculation of $Y_{OUT}$ and â is applied in, say lines 3–4 of the composite video signal. Having obtained â, it is applied to the filter coefficients (taps) so as to obtain a modified filter taps A (310) in accordance with the algorithmic expression:

$$A = A + \delta \cdot â$$

wherein A is the updated filter taps and δ is the restraining factor. The lower δ, the slower is the convergence of the filter taps A to their final value. The modified filter taps A are applied to the input composite signal for reducing ghosts (401). The filter may be utilized for reducing ghost constituents immediately after determining A, say from line 6 and onwards in the specified field. In this connection it is recalled that the visible lines start in say, line 24, and therefore when the lines become visible, the ghost removal procedure is already active.

As readily arises from the foregoing discussion, A is determined in an iterative manner during each field, until, eventually, convergence is achieved. Convergence will be achieved when a is substantially zero which, in turn, will occur when the ghost induced error calculated in step (308) is substantially zero. The latter case will reflect a situation of a substantive ghost-free composite video signal.

Having described, generally, a sequence of operation in accordance with the invention, there follows a more specific description of the various operational steps.

Figure 1:
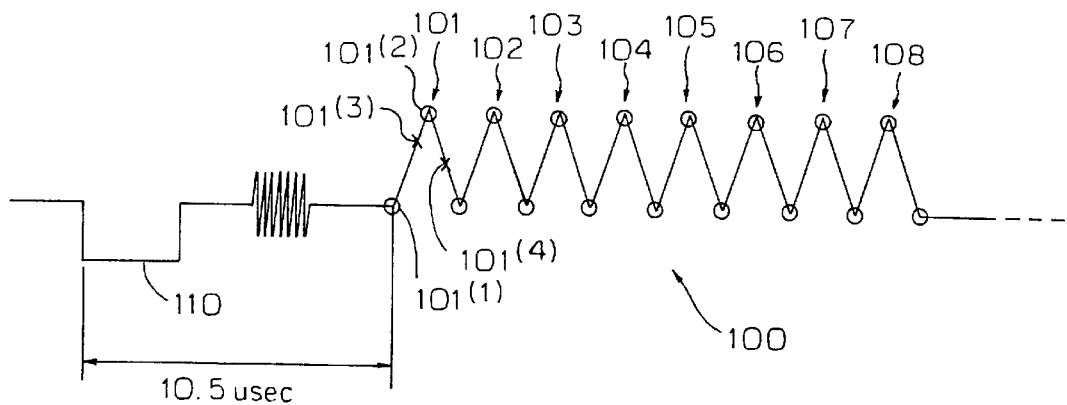
FIG. 1 is a schematic synthetic representation of a synchronization pattern in a teletext data line constituent of a composite video signal.

As readily evident from the graphic illustration of FIG. 1, the teletext signal has a known structure in which the signal can be at one of two levels, at the correct sampling time. Since, however, the sampling signal is not synchronized with the teletext signal, it is required at first to determine a teletext sampling error between the actual sampled teletext signal and the expected levels.

Before proceeding any firther, it should be noted that the synchronization pattern of FIG. 1 is illustrated for simplicity only. The actual form of each cycle of the specified pattern with designation of pre-defined levels and a more precise presentation of sampled values is illustated in FIG. 2.

Turning, at first, to the timing correction, since the teletext signal is sampled asynchronously, the teletext lines must first be correct for sampling time offset. In accordance with, say the SYSTEM B standard for teletext, each teletext line starts, 10.5 μsec following the H_sync signal (110), with a synchroniztion pattern (100) that includes eight cycles of cosine pattern (designated schematically as 101–108). Each cycle alternates between two analog levels (at 0% and 66% from the so-called white level), e.g. 101$^{(1)}$, 101$^{(2)}$, giving rise to 16 alternated values (represented as a sequence of 010101010 . . . data samples). In compliance with the Nyquist rate, the sampling rate should be at least twice higher the bit rate and accordingly 32 samples are obtained, i.e. four per each cycle (see 201$^{(1)}$ to 201$^{(4)}$ in FIG. 2).

Timing synchronization with the data carried by the teletext is essential for ghost cancellation. As mentioned above, the error induced by the ghost affects each sampled teletext datum amplitude and causes deviation from the well defined levels, in which the samples should be. If the samples, are not synchronized with the pre-defined levels (in-phase samples), the detected levels are wrong, and eventually the error that was induced by the ghost cannot be evaluated and obviously cannot be reduced.

Figure 2:
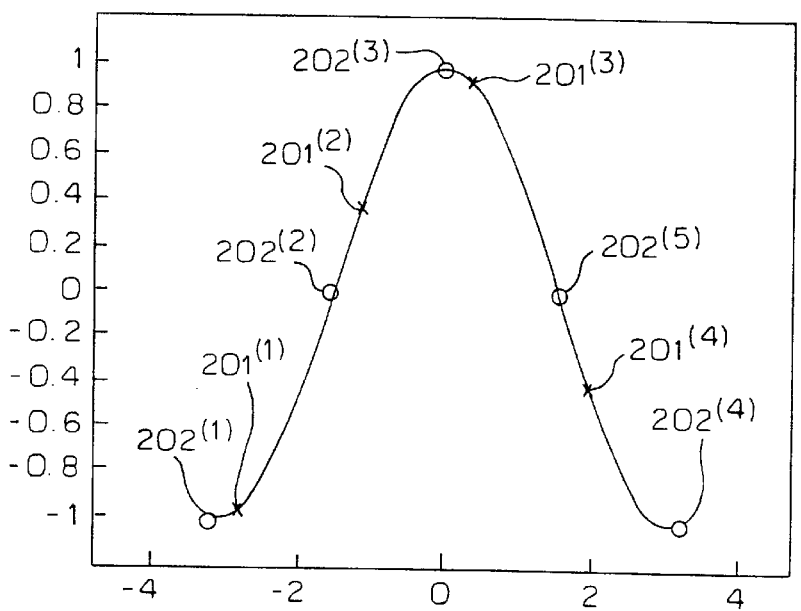
FIG. 2 is a precise synthetic representation of a cycle of the synchronization pattern illustrated in FIG. 1.

In other words, had the sampling rate been synchronized with the teletext synchronization patters, the sampled values would coincide with the pre-defined levels, i.e. 101$^{(1)}$, 101$^{(2)}$ etc. However, due to the lack of synchronized sampling, the actual sampled value deviate from the pre-defined levels (e.g. 101$^{(3)}$, 101$^{(4)}$, instead of 101$^{(1)}$, 101$^{(2)}$). The actual sampled values (standing for off-phase samples) have, thus, phase offset vis-a-vis the pre-defined levels (standing for in-phase samples). A more precise presentation is illustrated in FIG. 2 wherein one accurate cycle is illustrated showing four sampled values 201$^{(1)}$ to 201$^{(4)}$ vis-a-vis four pre-defined levels 202$^{(1)}$ to 202$^{(4)}$.

Accordingly, It is necessary, at first, to detect the phase offset out of the sampled data and then correct it. There follows now a description of one possible manner for realizing the specified phase offset detection and correction. The invention is not bound by this specific realization.

The synchronization pattern is the base for the recovery and processing for all data lines. The teletext synchronization pattern is first correlated with the expected pattern, which is saved in memory (matched filter). The peak of the correlation is approximated by a $2^{nd}$ order polynomial, from which the maximum and the timing offset is calculated.

Thus, in accordance with this embodiment, the, phase detection is based on three samples (peak±1) of main cycle, expected to act as a square (parabolic) function. This cycle is the peak cycle, generated in the correlation between the synchronization pattern at the start of the teletext data, with the same expected pattern in memory. As recalled values 202$^{(1)}$ to 202$^{(4)}$ stand for the in-phased samples whereas 202$^{(1)}$ to 202$^{(4)}$ stand for the out-phase samples (referred to also as off-phase samples).

The expression for sampled i function is presented in the following algorithmic expression (I):

$$Y(n) = f(t) \cdot \sum_{k} \delta(t - T \cdot n) \quad (I)$$

where T is the sampling period.

If there is any timing shift (i.e. phase offset) in sampling, the sampled function is presented in the following algorithmic expression (II):

$$Y(n)=f(t)\cdot\Sigma\delta(t-nT-\mu) \quad (II)$$

To simplify the calculations, the corresponding discrete time vector is denoted as n=[−1, 0, 1], in accordance with the following algorithmic expression (III):

$$Y(n)=a\cdot n^2+b\cdot n+c$$

There follows a matrix, presentation for three different values of n (algorithmic expression (IV):

$$\begin{pmatrix} y_1 \\ y_2 \\ y_3 \end{pmatrix} = \begin{pmatrix} n^2_1 & n_{-1} & 1 \\ n^2_0 & n_0 & 1 \\ n^2_1 & n_1 & 1 \end{pmatrix} \cdot \begin{pmatrix} a \\ b \\ c \end{pmatrix}$$

Where Y is the out-phased samples.
Substituting $\bar{n}$ with its values gives, (algorithmic expression 5):

$$\begin{pmatrix} y_1 \\ y_2 \\ y_3 \end{pmatrix} = \begin{pmatrix} 1 & -1 & 1 \\ 0 & 0 & 1 \\ 1 & 1 & 1 \end{pmatrix} \cdot \begin{pmatrix} a \\ b \\ c \end{pmatrix}$$

by inverting the matrix, [a b c ] can be evaluated by the following algorithmic expression (6):

$$\begin{pmatrix} a \\ b \\ c \end{pmatrix} = \begin{pmatrix} 0.5 & -1 & 0.5 \\ -0.5 & 0 & 0.5) \\ 0 & 1 & 0 \end{pmatrix} \cdot \begin{pmatrix} y_1 \\ y_2 \\ y_3 \end{pmatrix}$$

The peak position $$\frac{-b}{2a}$$

according to Viehta rule the peak position is the expression for the normalized sampling phase error, relatively to zero. Each of a, b and c is an inner product of two vectors of $3^{rd}$ dimension.

Having determined the teletext sampling error by detecting the sampling phase offsets, there follows a step of interpolation in order to obtain interpolated. samples that substantially coincide with the in-phase samples.

Thus, the phase correction interpolation filter taps are power series of μ (in accordance with algorithmic expression 7. Note that $$\mu = \frac{-b}{2a},$$

peak position), i.e.

$$h_n = \sum_{m=0}^{M} a_m(n) \cdot \mu^m$$

The coefficients $a_m(n)$ can be found in tables, and they are the optimum lues for fixed following parameters:
Power order (M);
Filter length (N);
Sampling rate;
Signal bandwidth
μ is a peak position As shown in step (402) in FIG. 4, the net effect is that the $h_I$ coefficients that are obtained by algorithmicic expression (7) when fed to the filter will undo the phase offset error that stems from the asynchronous sampling of the teletext synchronization pattern ($X_{In}$) and will yield an in-phase samples. The effect of the so obtained $h_I$ coefficients is illustrated in FIG. 2, where, as shown, the off-phase samples $201^{(1)}$ to $201^{(4)}$ are interpolated to, or close to, the in-phase samples $202^{(1)}$ to $202^{(4)}$ obviating, thus the need to physically re-sample the synchronization pattern.

It is accordingly appreciated that the sampled values of teletext lines after undergoing offset interpolation (so as to bring about interpolated in-phase samples), in the manner specified, constitute a reference (similar to the GCR) which will serve for the deghosting step described below.

Those versed in the art will readily appreciate the invention is, by no means, bound to the specific procedures described above for detecting off-phase teletext samples and the subsequent construction of interpolated in-phase teletext samples.

Before turning to the actual deghosting there fallows a preliminary step of so called "high frequencies enhancement" (step 304 in FIG. 3). The description below refers to a non-limiting example for achieving the high frequency enhancement.

Thus, and as is well known, most terrestrial channels attenuate the teletext lines spectrum, as well as the video spectrum, as same as a low pass filter, with a cutoff frequency (−3 dB) around a 4 MHz. This effect, attenuates the high frequency alternating samples amplitude, up to 6–7 dB.

Figure 5A:
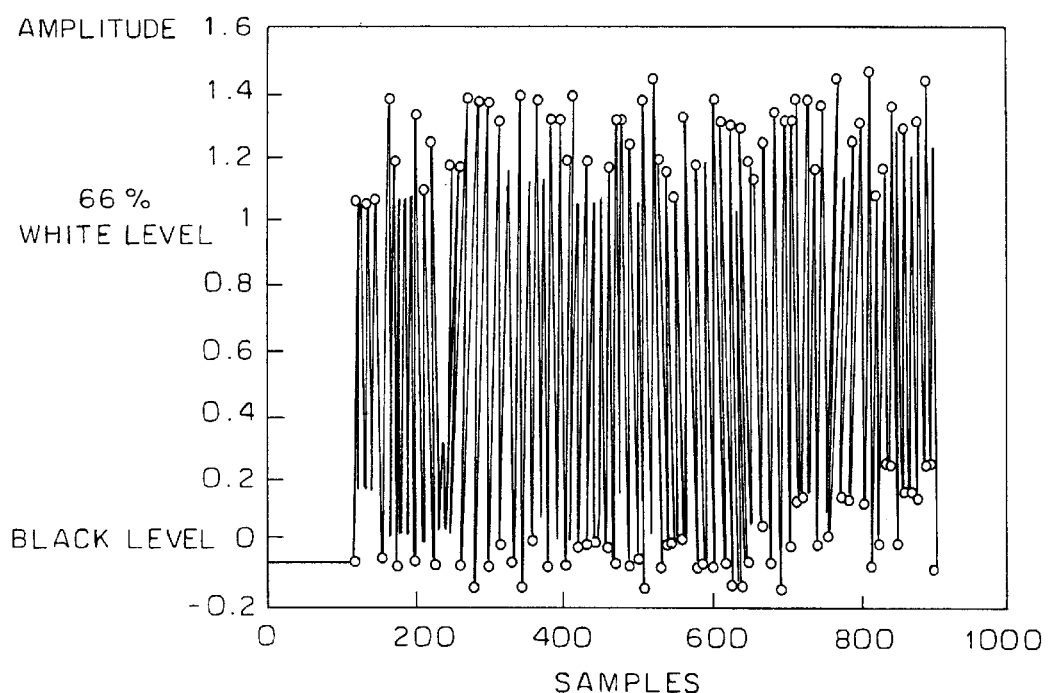
FIGS. 5A–B illustrate graphically synthetic non-attenuated and attenuated teletext data line respectively.
Figure 5B:
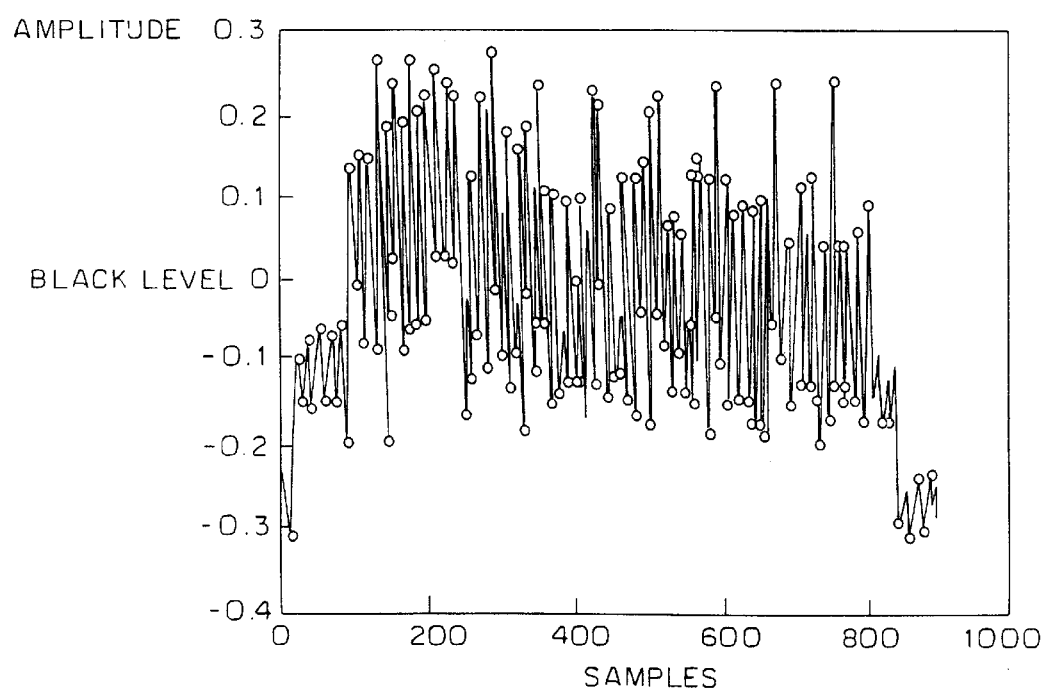

FIGS. 5A and 5B illustrate graphically synthetic non-attenuated and attenuated teletext data line, respectively.

Figure 6:
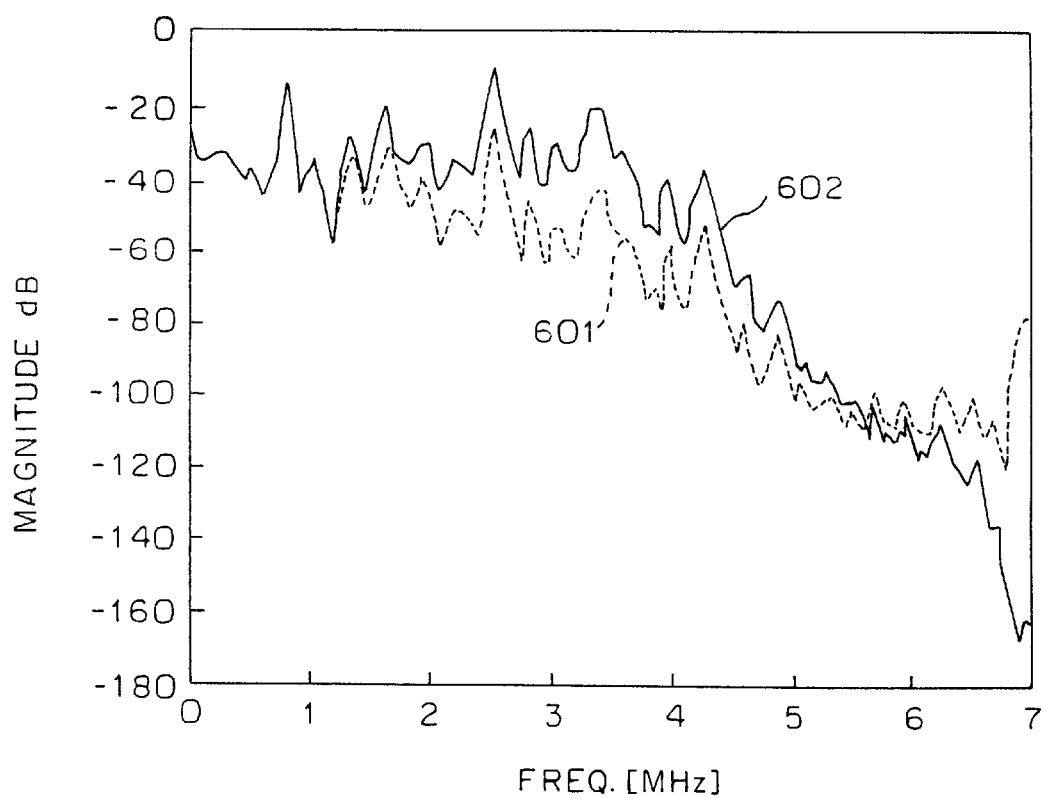
FIG. 6 illustrate graphically a comparison between the same teletext line power spectrum density, before and after applying highpass filter.

In order to cope with this problem in accordance with one embodiment, the teletext lines are first filtered by a high frequency enhancement filter (in the manner specified with respect to step (304), with selected gain through known per se $I^2$ C communication protocol. The default gain is 5 dB at 4.5 Mhz. FIGS. 6 compares between the same teletext line power spectrum density, before (601) and after (602) applying high pass filter.

Having accomplished high frequency enhancement, there follows a description of the deghosting step in accordance with a non-limiting example.

Figure 7A:
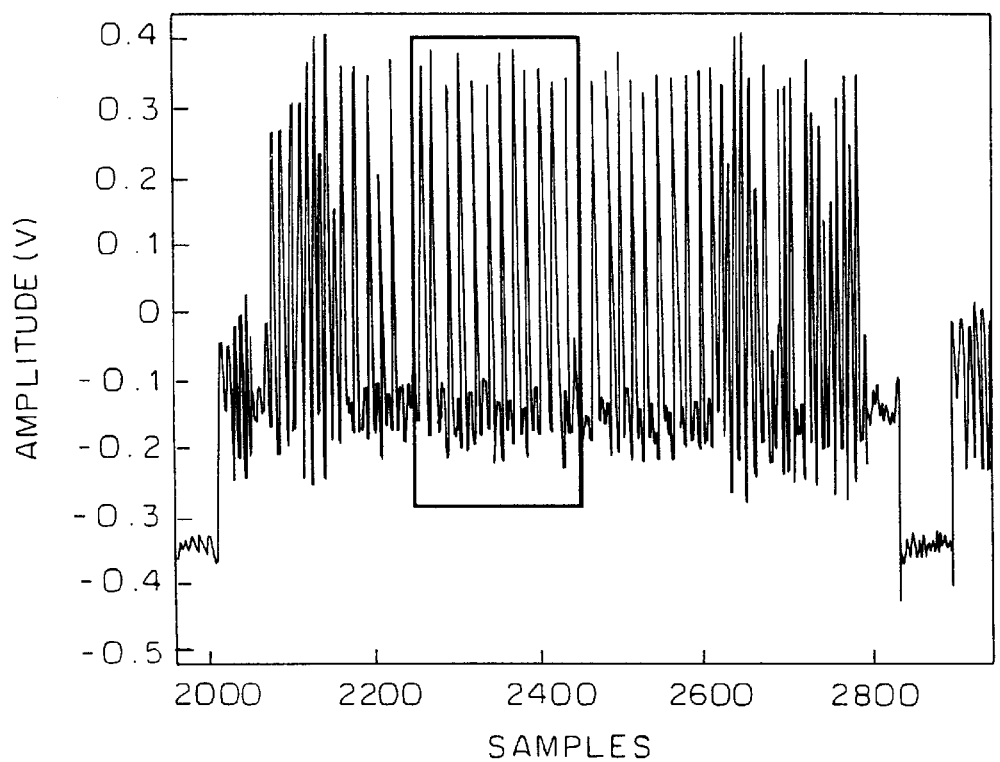
FIGS. 7A–B illustrate, schematically, a periodic pulses pattern of teletext data lines.
Figure 7B:
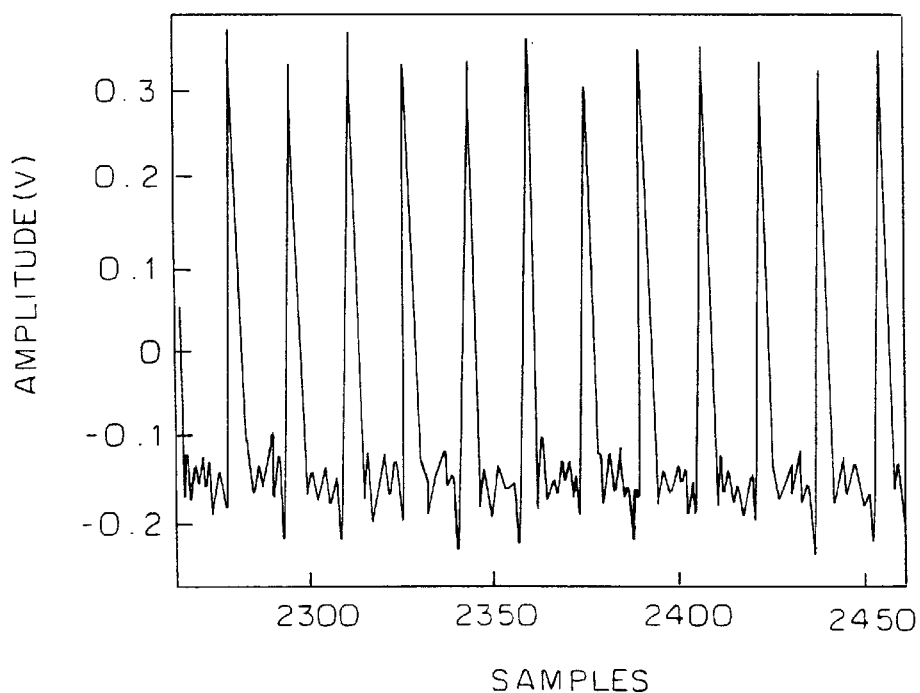

The first step calls for periodic data lines elimination where teletext lines which do not comply with certain quality levels are discarded and not used (305 in FIG. 3). The LMS process (used in a later phase for reducing ghosts) is based on the assumption that the sequences are WSS (Wide Sense Stationary) random vectors, therefore their autocorrelation is identically zero. For reasons with the a teletext data generators, some of the streams do not carry information, thus parts of the teletext data stream (or all of it) can be continuously zero, or periodically pulses transmission. Teletext data line having substantially continuous zero value, or periodically pulses transmissions do not meet the required quality criterion, and are therefore discarded (since, otherwise, they would interfere with the operation of the LMS algorithm). On the other hand, if the teletext data meets the quality criterion it is retained and used for further processing FIGS. 7A and 7B illustrate exemplary periodic pulses and zoom on periodic pulses, respectively, which as explained above will lead to discarding of the corresponding teletext data lines.

The type of data (pulses or zero's) is dangerous for the LMS algorithm and error down convergence that forms part of he deghosting phase. Therefore, special method for detection this type of teletext data lines, has been developed.

By way of non-limiting examples, the method for detection the specified type of teletext data lines is based on differentiating the data stream, and counting the number of transits inside the sequence. If main parts of the sequence are zeros, the number of transits will be low. If main parts of the sequence are round pulses, the energy of the differentiated sequence will be low.

The specified quality control criterion may vary, depending upon the particular application.

Having obtained teletext data lines which meet the quality criterion, (and which were subject to high frequency enhancement and to in-phase interpolation), there follows a description of the actual deghost phase.

The LMS algorithm (see steps 307 to 310 below) is based on figuring the error that is induced by the ghost, and exploit it to build a set of recursive taps for digital filtering use.

In normal ghost canceling systems, the error is simply the difference between the collected GCR (ghost canceling reference) and the expected GCR. saved in memory.

In accordance with the invention, the equalization steps do not have expected values of the collected teletext (they are random variables) but rather have information about the levels in which every sample allowed to be in a discrete time. The way to calculate the ghost induced error in the equalization process is to calculate the difference between two corrected teletext lines (phase and amplitude), and their allowed values, i.e. Error=$Y_{OUT}$–sliced ($Y_{OUT}$).

The ghost induced error is based on the difference between two lines (from the same field or successive fields). Subtracting the lines has few advantages: first, subtracting two lines removes immediately any DC level, if exists, and secondly, it gives three expected levels ("1", "0", "−1"), rather than two only ("1" and "0" for each line). In the case that the composite video signal does not include ghost constituent, the specified error is very little considering that the interpolated sampled values (after undergoing interpolation in the manner specified above) basically coincide with tie pre-defined levels of the noise-free (ghost-free) teletext data line. If, on the over hand, there is a ghost constituent, the sampled values (after undergoing interpolation in the manner specified above) deviate from the pre-defined levels of the noise-free (ghost-free) teletext data line. The invention is not bound by the specific subtraction procedure described herein.

The ghost induced error that corresponds t;o a teletext line consists of 688 values (made of bit rate of 43 times 8 bit and multiplied by a factor 2, due to the Nyquist sampling constraint).

The filter (generally known per se, e.g GC3 hardware, commercially available from Oren Semiconductor, Israel) is a 576 taps ("A" constitutes the specified 576 taps) filter, used for deghosting all video lines (401) in say $6^{th}$ line to the $2^{nd}$ line in the subsequent field.

The filter is "stolen" for calculation purposes (steps 301 to 310) for time interval that corresponds to, say lines 3 to 5 in each video field. During this time interval the video-in (the composite video signal) is bypassed to video-out without any processing, but this has a little, or no effect considering that these lines are not visible. In the rest of the lines the filter is used for deghosting purposes; as illustrated schematically in (401).

In the method claims that follow, alphabetic characters used to designate claim steps are provided for convenience only and do not imply any particular order of performing the steps.

In the method claims that follow, alphabetic characters used to designate claim steps are provided for convenience only and do not imply any particular order of performing the steps.

The present invention has been described with a certain degree of particularity but those versed in the art will readily appreciate that various alterations and modifications may be carried out without departing from the scope of the following claims:

What is claimed is:

1. A method for reducing a ghost constituent of a composite video signal; the composite video signal includes a teletext data lines constituent; the method comprising the steps of:

(a) detecting and processing at least one teletext data line constituent so as to obtain a ghost induced error;

(b) utilizing said ghost induced error for calculating filter coefficients;

(c) applying said composite video signal to a filter having said filter coefficient for obtaining substantially deghosted composite video signal.

2. The method according to claim 1, wherein said step (a) includes:

(i) detecting at least one teletext line constituent from the composite video signal;

(ii) sampling a teletext synchronization pattern of the teletext line constituent;

(iii) determining a teletext sampling error by identifying a phase offset of sampled values vis-a-vis pre-defined values of the teletext synchronization pattern, and correcting said error by interpolating substantially in-phase samples.

3. The method according to claim 2, wherein said sampling error that stems from the asynchronous sampling of the teletext synchronization pattern ($X_{In}$) is corrected by feeding the filter coefficients $h_I$ which comply with the following algorithmic expression:

$$h_n = \sum_{m=0}^{M} a_m(n) \cdot u_m$$

The coefficients $a_m(n)$ are the optimum values for fixed following parameters:

power order (M);
   filter length (N);
   sampling rate;
   signal bandwidth
   $\mu$ is a peak position.

4. The method according to claim 1, wherein said processing stipulated in said step (a) further comprising: enhancing the high frequency constituent of the composite video signal.

5. The method according to claim 1, wherein said processing further includes: discarding teletext data lines which do not meet a quality control criterion.

6. The method according to claim 5, wherein teletext data line or portion thereof having substantially continuous zero value, or periodically pulses transmissions do not meet said quality control criterion.

7. The method according to claim 1, wherein said filter coefficients calculation is determined in an iterative manner.

8. The method according to claim 7, wherein said filter coefficients A are determined in accordance with the following algorithmic expression:

$$A = A + \delta \cdot \hat{a},$$

wherein A are the filter coefficients, and $\delta$ is a restraining factor, $\hat{a}$ is a set of modified coefficients.

9. The method according to claim 1, wherein said steps (b) and (c), further comprising:

(i) subtracting a first teletext line from a second teletext line, so as to reduce D.C level and obtain substantially three signal levels; repeating the following steps (ii) to (iv), as many times as required;

(ii) obtaining ghost induced error based on the deviation of samples values from said three levels;

(iii) calculating filter coefficients based on said ghost induced error and previous filter coefficients; and (iv) applying said composite video signal to the filter having said filter coefficient for obtaining substantially deghosted composite video signal.

10. A system for reducing a ghost constituent of a composite video signal; the composite video signal includes a teletext data lines constituent; the system comprising:

(a) a unit for detecting and processing at least one teletext data line constituent so as to obtain a ghost induced error; and (b) a unit utilizing said ghost induced error for calculating filter coefficients;

(c) a unit for applying said composite video signal to a unit having said filter coefficient for obtaining substantially deghosted composite video signal.

11. The system according to claim 10, wherein said unit, stipulated in (a), is further being operative for:

(i) detecting at least one teletext line constituent from the composite video signal;

(ii) sampling a teletext synchronization pattern of the teletext line constituent;

(iii) determining a teletext sampling error by identifying a phase offset of sampled values vis-a-vis pre-defined values of the teletext synchronization pattern, and correcting said error by interpolating substantially in-phase samples.

12. The system according to claim 11, wherein said sampling error that stems from asynchronous sampling of the teletext synchronization pattern ($X_{In}$) is corrected by feeding filter coefficients $h_I$ which comply with the following algorithmic expression:

$$h_n = \sum_{m=0}^{M} a_m(n) \cdot u_m$$

the coefficients $a_m(n)$ are the optimum values for fixed following parameters:

Power order (M);
   Filter length (N);
   Sampling rate;
   Signal bandwidth;
   $\mu$ is a peak position.

13. The system according to claim 10, wherein said processing further includes: discarding teletext data lines which do not meet a quality control criterion.

14. The system according to claim 13, wherein teletext data line or portion thereof having substantially continuous zero value, or periodically pulses transmissions do not meet said quality control criterion.

15. The system according to claim 10, wherein said filter coefficients calculation is determined in an iterative manner.

16. The system according to claim 15, wherein said filter coefficients A are determined in accordance with the following algorithmic expression:

$$A = A + \delta \cdot \hat{a}$$

wherein A are the filter coefficients, and $\delta$ is a restraining factor, $\hat{a}$ is a set of modified coefficients.

17. The system according to claim 10, wherein the unit stipulated in said (b) and (c), is further operative to:
  (i) subtracting a first teletext line from a second teletext line, so as to reduce D.C level and obtain substantially three signal levels; repeating the following steps (ii) to (iv), as many times as required;
  (ii) obtaining ghost induced error based on the deviation of samples values from said three levels;
  (iii) calculating filter coefficients based on said ghost induced error and previous filter coefficients; and
  (iv) applying said composite video signal to the filter having said filter coefficient for obtaining substantially deghosted composite video signal.

* * * * *